United States Patent
Vanderveken et al.

(10) Patent No.: US 7,026,384 B2
(45) Date of Patent: Apr. 11, 2006

(54) PROCESS FOR THE PREPARATION OF AN AQUEOUS DISPERSION OF HALOGENATED VINYL POLYMERS INVOLVING A BASIC AFTER-TREATMENT

(75) Inventors: Yves Vanderveken, Heverlee (BE); Bernard Guenaire, Damparis (FR); Xavier Bacque, Tavaux (FR)

(73) Assignee: SOLVAY (Société Anonyme), Brussels (BE)

( * ) Notice: Subject to any disclaimer, the term of this patent is extended or adjusted under 35 U.S.C. 154(b) by 0 days.

(21) Appl. No.: 10/784,799

(22) Filed: Feb. 24, 2004

(65) Prior Publication Data

US 2004/0167267 A1    Aug. 26, 2004

Related U.S. Application Data

(62) Division of application No. 09/581,806, filed as application No. PCT/EP98/08145 on Dec. 10, 1998, now Pat. No. 6,730,726.

(30) Foreign Application Priority Data

Dec. 19, 1997 (FR) .................................. 97 16444

(51) Int. Cl.
C08K 3/32 (2006.01)
C08J 3/03 (2006.01)
C08J 5/02 (2006.01)

(52) U.S. Cl. .............. 524/414; 524/417; 524/567; 106/270; 106/284.1; 106/284.2; 106/284.3

(58) Field of Classification Search ........... 524/414, 524/417, 567, 568; 106/270, 284.1, 284.2, 106/284.3

See application file for complete search history.

(56) References Cited

U.S. PATENT DOCUMENTS

| | | | |
|---|---|---|---|
| 3,300,423 A | | 1/1967 | Brown et al. |
| 3,558,542 A | * | 1/1971 | McDonald .................. 524/271 |
| 3,817,959 A | * | 6/1974 | Balwe et al. ................ 526/200 |
| 3,883,455 A | | 5/1975 | Peos |
| 4,150,210 A | * | 4/1979 | Anderson et al. ........... 524/747 |
| 4,374,205 A | | 2/1983 | Hall |
| 4,438,244 A | * | 3/1984 | Sielfeld et al. ............. 526/202 |
| 5,340,862 A | | 8/1994 | Silbermann et al. |
| 5,359,011 A | | 10/1994 | Vielhaber et al. |
| 6,730,726 B1 | | 5/2004 | Vanderveken et al. |

FOREIGN PATENT DOCUMENTS

| | | | |
|---|---|---|---|
| AU | 91/81413 | | 7/1991 |
| CA | 2 074 034 | | 1/1993 |
| DE | 2 246 499 | | 4/1974 |
| DE | 2603025 A | * | 8/1977 |
| DE | 3505238 | | 8/1986 |
| EP | 0 004 884 | | 10/1979 |
| EP | 0 268 042 | | 5/1988 |
| EP | 0 469 405 | | 2/1992 |
| EP | 0 524 497 | | 1/1993 |

* cited by examiner

*Primary Examiner*—Kelechi C. Egwim
(74) *Attorney, Agent, or Firm*—Oblon, Spivak, McClelland, Maier & Neustadt, P.C.

(57) ABSTRACT

The invention relates to a process for the preparation of an aqueous dispersion of halogenated vinyl polymers by polymerization, according to which, after polymerization, a basic agent is added in an amount such that the pH of the aqueous dispersion is less than approximately 5. The invention also relates to the aqueous dispersion obtained, which can be coated onto polymeric substrates made of paper or of regenerated cellulose.

12 Claims, No Drawings

PROCESS FOR THE PREPARATION OF AN AQUEOUS DISPERSION OF HALOGENATED VINYL POLYMERS INVOLVING A BASIC AFTER-TREATMENT

This application is a divisional application of U.S. Ser. No. 09/581,806, filed Aug. 28, 2000, now U.S. Pat. No. 6,730,726, which is a National Stage application of PCT/EP98/08145filed Dec. 10, 1998.

The invention relates to a process for the preparation of an aqueous dispersion of halogenated vinyl polymers, to the aqueous dispersion obtained and to its use in the coating of substrates.

Aqueous dispersions of halogenated vinyl polymers, such as vinylidene chloride and/or vinyl chloride polymers, are characterized after polymerization by a pH which is generally less than approximately 2. Unfortunately, these aqueous dispersions exhibit both poor compatibility with waxes, which is revealed by poor mechanical stability, and poor thermal stability, from which result problems of sealability and problems of corrosion of the thermoforming equipment during the production of pharmaceutical blister packs.

It is known to add a certain amount of specific basic agents to these aqueous dispersions of halogenated vinyl polymers, which have a pH of less than approximately 2, so that the dispersions have a pH of greater than approximately 5.

Thus, Patent Application DE-A-2,246,499 discloses the addition of a certain amount of aqueous ammonia to aqueous dispersions of vinyl chloride and/or vinylidene chloride copolymers, so that the latter have a pH of greater than or equal to 5. It is nevertheless necessary to add, to the aqueous dispersions obtained, in addition to aqueous ammonia, an epoxide compound in order to prevent the dispersions from becoming coloured over time. This process exhibits the disadvantage of requiring the addition of an epoxide compound to the aqueous dispersions. This is because this further addition results in an increase in the costs and complicates the preparation of the aqueous dispersions of halogenated polymers.

Patent Application EP-A-0,469,405 discloses the addition, to aqueous dispersions of polymers obtained by polymerization of a mixture of monomers comprising 10 to 100% by weight of halogen-comprising monomers, of a basic agent in an amount such that the pH is regulated at a value of between 5 and 10. The process presented by Patent Application EP-A-0,469,405 makes it possible to avoid the use of an epoxide compound in addition to the basic agent. It has nevertheless been found that the aqueous dispersions disclosed in this patent application are not entirely satisfactory with regard to the stability of their colouring over time.

Patent Application EP-A-0,524,497 teaches the addition of an active substance, in addition to the basic agent, in order to overcome the disadvantages presented by the process of Patent Application EP-A-0,469,405. This process nevertheless exhibits the disadvantage of requiring the addition of an active substance to the aqueous dispersions. This further addition necessarily results in an increase in the costs and complicates the preparation of the aqueous dispersions of halogenated polymers.

In order to overcome the disadvantages presented by the processes of the prior art, a subject-matter of the present invention is a process which is particularly suited to the preparation of an aqueous dispersion of halogenated vinyl polymers which exhibits compatibility with waxes, a thermal stability and a colouring stability over time which are improved with respect to those of the aqueous dispersions of halogenated vinyl polymers of the prior art and which avoids the necessity of adding an epoxide compound, an active substance and/or another substance which would increase the costs and/or would complicate the preparation of the aqueous dispersions of halogenated polymers.

Another subject-matter of the invention is such an aqueous dispersion of halogenated vinyl polymers which does not exhibit the disadvantages of the aqueous dispersions of halogenated vinyl polymers of the prior art.

Another subject-matter of the invention is the use of the said aqueous dispersion of halogenated vinyl polymers for the coating of substrates.

To this end, the invention relates to a process for the preparation of an aqueous dispersion of halogenated vinyl polymers by polymerization, according to which, after polymerization, a basic agent is added in an amount such that the pH of the aqueous dispersion is less than approximately 5.

The invention also relates to an aqueous dispersion of halogenated vinyl polymers, according to which the aqueous dispersion comprises a basic agent in an amount such that the pH is less than approximately 5.

The present invention also relates to the use of the aqueous dispersion of halogenated vinyl polymers obtained for the coating of substrates made of polymers, of paper or of regenerated cellulose.

The term "basic agent" is understood to denote, for the purposes of the present invention, any material which, when it is added to an aqueous dispersion of halogenated vinyl polymers, renders the aqueous dispersion more basic than it was beforehand. More specifically, the term "basic agent" is understood to denote any material which, placed in an aqueous solution, provides it with a pH of greater than approximately 2.

In a preferred embodiment, the basic agent is chosen from alkali metal phosphates or the mixtures of these with one another or with another basic agent. The particularly preferred basic agent is chosen from phosphates not having more than one phosphorus atom or the mixtures of these with one another or with another basic agent. Mention may be made, among the phosphates not having more than one phosphorus atom, in a non-limiting way, of trisodium and tripotassium phosphates, disodium and dipotassium phosphates, and monosodium and monopotassium phosphates. A very particularly preferred basic agent is trisodium phosphate ($Na_3PO_4$).

In another preferred embodiment, the basic agent is chosen from sodium hydroxides and the mixtures of the latter with another basic agent. A very particularly preferred basic agent is sodium hydroxide.

In another preferred embodiment, the basic agent is chosen from alkaline earth metal hydroxides or the mixtures of these with one another or with another basic agent. Mention may be made, among alkaline earth metal hydroxides, in a non-limiting way, of calcium hydroxide.

In another preferred embodiment, the basic agent is chosen from alkali metal phosphites or the mixtures of these with one another or with another basic agent. Mention may be made, among alkali metal phosphites, in a non-limiting way, of trisodium and tripotassium phosphites, disodium and dipotassium phosphites, and monosodium and monopotassium phosphites.

In another preferred embodiment, the basic agent is chosen from alkali metal carbonates or the mixtures of these with one another or with another basic agent. Mention may be made, among alkali metal carbonates, in a non-limiting way, of sodium carbonate, potassium carbonate and potassium bicarbonate.

In another preferred embodiment, the basic agent is chosen from alkali metal citrates or the mixtures of these with one another or with another basic agent. Mention may be made, among alkali metal citrates, in a non-limiting way, of sodium citrate and potassium citrate.

In another preferred embodiment, the basic agent is chosen from alkali metal acetates or the mixtures of these with one another or with another basic agent. Mention may be made, among alkali metal acetates, in a non-limiting way, of sodium acetate and potassium acetate.

In another preferred embodiment, the basic agent is chosen from alkali metal formates or the mixtures of these with one another or with another basic agent. Mention may be made, among alkali metal formates, in a non-limiting way, of sodium formate and potassium formate.

In a preferred embodiment, the basic agent is chosen from alkali metal oxides or the mixtures of these with one another or with another basic agent.

The amount of basic agent to be added to the aqueous dispersion will be such that the pH of the aqueous dispersion is less than approximately 5.

The pH of the aqueous dispersion is generally adjusted to a value of less than approximately 5, preferably to a value of less than or equal to 4.5, in a particularly preferred way to a value of less than or equal to 4 and in a very particularly preferred way to a value of less than or equal to 3.5.

Furthermore, the pH of the aqueous dispersion is preferably greater than approximately 2.

The pH of the aqueous dispersion is adjusted after the polymerization, that is to say at any time ranging from the degassing and from the placing under vacuum of the autoclave up to the time of the use of the aqueous dispersion. The pH of the aqueous dispersion is preferably adjusted immediately after the polymerization, that is to say immediately after the degassing and the placing under vacuum of the autoclave.

The term "aqueous dispersion", also known as latex, is understood to denote, for the purposes of the present invention, the dispersion of polymer in water obtained after radical aqueous emulsion polymerization. The aqueous dispersion is usually characterized by a concentration of solids of approximately at least 45% by weight. The aqueous dispersion is usually characterized by a concentration of solids of approximately at most 70% by weight. In general, the individual polymer particles in the aqueous dispersion exhibit mean diameters of approximately at least 0.1 µm. The individual polymer particles in the aqueous dispersion usually exhibit mean diameters of approximately at most 0.2 µm.

The term "radical aqueous emulsion polymerization" is understood to denote, for the purposes of the present invention, any radical polymerization process which is carried out in aqueous medium in the presence of emulsifying agents and of radical initiators. This definition specifically encompasses the aqueous emulsion polymerization referred to as "conventional", in which water-soluble radical initiators are employed, and microsuspension polymerization, also known as homogenized aqueous dispersion polymerization, in which oil-soluble initiators are employed and an emulsion of monomer droplets is produced by virtue of powerful mechanical stirring and the presence of emulsifying agents.

The invention is particularly suited to "conventional" aqueous emulsion polymerization, which is carried out under the conditions known to a person skilled in the art. Thus it is that the polymerization is carried out with the involvement of emulsifying agents and of water-soluble initiators present in amounts known to a person skilled in the art.

Mention may be made, as examples of emulsifying agents, of anionic emulsifying agents and nonionic emulsifying agents. Mention may be made, among anionic emulsifying agents, in a non-limiting way, of paraffin sulphonates, alkyl sulphates, alkylsulphonates, alkylarylmonosulphonates, alkylaryldisulphonates and alkyl sulphosuccinates. Mention may be made, among nonionic emulsifying agents, in a non-limiting way, of ethoxylated alkyl or alkylaryl derivatives.

Mention may be made, as examples of water-soluble initiators, of water-soluble peroxides, such as alkali metal or ammonium persulphates, hydrogen peroxide, perborates or t-butyl hydroperoxide, used alone or in combination with a reducing agent.

The term "halogenated vinyl polymers" is understood to denote, for the purposes of the present invention, the polymers obtained by radical aqueous emulsion polymerization of halogenated vinyl monomers, that is to say both the homopolymers of halogenated vinyl monomers and the copolymers which they form with one another or with other monomers copolymerizable with them, such as, for example, vinyl esters, vinyl ethers, acrylic acids, acrylic esters, acrylonitriles, acrylamides, styrene derivatives and olefins.

The term "halogenated vinyl monomer" is understood to denote, for the purposes of the present invention, any monomer polymerizable by the radical route which has a terminal olefinic unsaturation and which is substituted by at least one halogen atom. These monomers are preferably chosen from substituted ethylene and propylene derivatives and comprise only two or three carbon atoms respectively. Mention may be made, as non-limiting examples of such monomers, of vinyl chloride, vinylidene chloride, vinyl bromide, vinyl fluoride, vinylidene fluoride, trifluoroethylene, tetrafluoroethylene, chlorotrifluoroethylene and hexafluoropropylene. The halogen atoms are preferably chosen from chlorine and fluorine atoms.

The invention is particularly suited to the polymerization of chlorine-comprising monomers, such as vinyl chloride and vinylidene chloride. The preferred halogenated vinyl polymers are therefore chlorine-comprising polymers.

The term "chlorine-comprising polymers" is therefore understood to denote, for the purposes of the present invention, both homopolymers and copolymers of chlorine-comprising vinyl monomers, in particular homopolymers of chlorine-comprising vinyl monomers, such as vinyl chloride and vinylidene chloride, as well as copolymers involving vinyl chloride and vinylidene chloride and copolymers of vinyl chloride and/or of vinylidene chloride with other monomer(s) copolymerizable with them chosen from vinyl esters, such as, for example, vinyl acetate, vinyl ethers, acrylic acids, acrylic esters, acrylonitriles, acrylamides, styrene derivatives and olefins, such as butadiene and ethylene.

In a more than preferred way, the chlorine-comprising polymers are vinylidene chloride polymers.

The term "vinylidene chloride polymers" is understood to denote any polymer comprising at least 50% by weight and preferably 60% by weight of vinylidene chloride. The vinylidene chloride polymers according to the invention thus denote both vinylidene chloride homopolymers and its copolymers comprising monomer units derived from one or more comonomers such as, for example, vinyl chloride, alkyl acrylates, alkyl methacrylates, acrylic acid, methacrylic acid, acrylonitrile, methacrylonitrile, acrylamides, methacrylamides or olefins, such as butadiene and ethylene. The alkyl acrylates and methacrylates generally have an alkyl group comprising from 1 to 8 carbon atoms. The alkyl acrylates and methacrylates preferably have an alkyl group comprising from 1 to 4 carbon atoms. Methyl acrylate, ethyl acrylate and methyl methacrylate are particularly preferred.

It is particularly advantageous to apply the process of the invention to copolymers comprising from 60 to 95% by weight of vinylidene chloride.

The aqueous dispersions of halogenated vinyl polymers according to the invention are particularly suited to comprising a wax.

The term "wax" is understood to denote, for the purposes of the present invention, any natural or artificial wax. Mention may be made, as non-limiting examples, of carnauba wax, beeswax, Chinese wax, ozokerite, polyolefin waxes and montan waxes, these being esterified.

The amount of wax usually added to the aqueous dispersion of vinylidene chloride polymer is at least 2 g/kg on a dry basis, preferably at least 3 g/kg on a dry basis. The amount of wax added is usually at most 30 g/kg on a dry basis, preferably at most 20 g/kg on a dry basis.

The aqueous dispersions of halogenated vinyl polymers according to the invention are used for the coating of substrates made of polymers, of paper or of regenerated cellulose.

The aqueous dispersions of halogenated vinyl polymers according to the invention are preferably used in the production of pharmaceutical blister packs. In a particularly preferred way, the aqueous dispersions of halogenated vinyl polymers according to the invention are used for the coating of polymeric substrates which give rise to the production of pharmaceutical blister packs.

The term "coating" is understood to denote, for the purposes of the present invention, any process which consists in coating the aqueous dispersion of halogenated vinyl polymers onto a substrate which is usually a polymer substrate, paper or regenerated cellulose. Mention may be made, as non-limiting examples of coating processes, of air knife coating and gravure roll coating.

The polymeric substrates which can be coated with the aqueous dispersion according to the invention are, for example, poly(vinyl chloride), polyesters, polyamides and polypropylene.

The aqueous dispersions of halogenated vinyl polymers according to the invention, comprising a basic agent in an amount such that the pH of the aqueous dispersion is less than approximately 5 (and greater than approximately 2), exhibit good compatibility with waxes, which is revealed by good mechanical stability, and good thermal stability, from which result good sealability during the production of pharmaceutical blister packs and good colouring stability over time. Furthermore, no problem of corrosion of the thermoforming equipment during the production of pharmaceutical blister packs arises.

In fact, the aqueous dispersions according to the invention, comprising a basic agent in an amount such that the pH of the aqueous dispersion is less than approximately 5 (and greater than approximately 2), exhibit a compatibility with waxes, used as antiblocking agent, which is markedly improved with respect to the aqueous dispersions of the prior art which do not comprise a basic agent and which have a pH of less than approximately 2.

The aqueous dispersions according to the invention, comprising a basic agent in an amount such that the pH of the aqueous dispersion is less than approximately 5 (and greater than approximately 2), exhibit a colouring which is more stable over time than the aqueous dispersions of the prior art comprising a basic agent in an amount such that the pH of the aqueous dispersion is greater than approximately 5, without it being necessary to add thereto an epoxide compound, an active substance and/or another substance which would increase the costs and/or would complicate the preparation of the aqueous dispersions of halogenated polymers.

When the aqueous dispersion according to the invention are coated onto a substrate made of polymers, of paper or of regenerated cellulose, a very slight release of hydrochloric acid is then observed at 160° C., a sign of very good thermal stability, in contrast to the aqueous dispersions of halogenated vinyl polymers of the prior art which do not comprise a basic agent and which have a pH of less than approximately 2. Furthermore, during the use of the aqueous dispersions according to the invention in the production of pharmaceutical blister packs, the sealability of the films is noteworthy and no problem of corrosion of the thermoforming equipment is observed, in contrast to the aqueous dispersions of halogenated vinyl polymers of the prior art which do not comprise a basic agent and which have a pH of less than approximately 2.

The aqueous dispersions according to the invention furthermore exhibit a very low percentage of lumps, a sign of very good mechanical stability. The aqueous dispersions according to the invention are also characterized by an improved film-forming ability.

The examples which follow are intended to illustrate the present invention without, however, limiting the scope thereof.

EXAMPLE 1

Preparation of an Aqueous Dispersion of Vinylidene Chloride Polymer

An aqueous dispersion of the copolymer of vinylidene chloride, of methyl acrylate and of vinyl chloride, Ixan® PA 331 (Solvay), was obtained. The amount of sodium hydroxide, in the form of a 2N aqueous solution, needed to bring the pH of the aqueous dispersion to 4 was added to this aqueous dispersion.

The pH of the aqueous dispersion obtained was measured by reading with a pHmeter at 20° C. without diluting. The content of dry matter was determined by drying with a thermobalance to constant weight, with a temperature programme not exceeding 110° C. The specific gravity was determined at 20° C. with a densimeter using the technique of differential measurement of oscillations of a cell filled with liquid (Paar DMA 46 device). The surface tension was measured at 20° C. by the Wilhelmy plate method (Krüss device). The stability (percentage by weight of lumps), which is a measurement of the high-speed mechanical stability, was measured according to ISO Standard 2006 with the addition of 100 ppm of a fluorinated antifoaming agent of Fluowet® PP type. The film-forming ability was measured in the following way: a glass plate, degreased beforehand, is steeped in the latex, which has been filtered through a 60 μm filter. It is subsequently dried in a stream of air at 23° C. (flow rate: 2 l/minute). The extinction of a beam of white light (expressed in μA) is subsequently measured after having calibrated, at 100 μA, the extinction of the beam of white light for an uncoated strip.

The pH, content of dry matter, specific gravity, surface tension, stability and film-forming ability results measured on the aqueous dispersion, obtained after the addition of sodium hydroxide, of the vinylidene chloride polymer are summarized in Table I.

EXAMPLE 2

Preparation of an Aqueous Dispersion of Vinylidene Chloride Polymer

An aqueous dispersion of the copolymer of vinylidene chloride, of methyl acrylate and of vinyl chloride, Ixan® PA 331 (Solvay), was obtained. The amount of trisodium phosphate ($Na_3PO_4.12H_2O$), in the form of a 100 g/litre aqueous solution, needed to bring the pH of the aqueous dispersion to 3.6 was added to this aqueous dispersion.

The pH, the content of dry matter, the specific gravity, the surface tension, the stability and the film-forming ability were measured, in the same way as in Example 1, on the aqueous dispersion, obtained after the addition of trisodium phosphate, of the vinylidene chloride polymer.

The results of these various measurements are summarized in Table I.

EXAMPLE 3

Comparative Example

An aqueous dispersion of the copolymer of vinylidene chloride, of methyl acrylate and of vinyl chloride, Ixan® PA 331 (Solvay), was obtained.

The pH, the content of dry matter, the specific gravity, the surface tension, the stability and the film-forming ability were measured, in the same way as in Example 1, on the aqueous dispersion, to which basic agent has not been added, of the vinylidene chloride polymer.

The results of these various measurements are summarized in Table I.

TABLE I

| Example | pH | Dry matter; % by weight | Specific gravity; kg/dm³ | Surface tension; mN/m | Stability; % by weight of lumps | Film-forming ability; μA |
|---|---|---|---|---|---|---|
| 1 | 4 | 60 | 1.32 | 35 | 0.45 | >90 |
| 2 | 3.6 | 60 | 1.32 | 34 | 0.14 | >90 |
| 3 | 2 | 60 | 1.32 | 34 | 0.36 | 76 |

EXAMPLE 4

Preparation of an Aqueous Dispersion of Vinylidene Chloride Polymer

An aqueous dispersion of the copolymer of vinylidene chloride and of methyl acrylate, Ixan® PA 114 (Solvay), was obtained. The amount of trisodium phosphate ($Na_3PO_4.12H_2O$), in the form of a 100 g/litre aqueous solution, needed to bring the pH of the aqueous dispersion to 4.1 was added to this aqueous dispersion.

The pH, the content of dry matter, the specific gravity, the surface tension, the stability and the film-forming ability were measured, in the same way as in Example 1, on the aqueous dispersion, obtained after the addition of trisodium phosphate, of the vinylidene chloride polymer.

The results of these various measurements are summarized in Table II.

EXAMPLE 5

Comparative Example

An aqueous dispersion of the copolymer of vinylidene chloride and of methyl acrylate, Ixan® PA 114 (Solvay), was obtained.

The pH, the content of dry matter, the specific gravity, the surface tension, the stability and the film-forming ability were measured, in the same way as in Example 1, on the aqueous dispersion, to which basic agent has not been added, of the vinylidene chloride polymer.

The results of these various measurements are summarized in the Table II.

TABLE II

| Example | pH | Dry matter; % by weight | Specific gravity; kg/dm³ | Surface tension; mN/m | Stability; % by weight of lumps | Film-forming ability; μA |
|---|---|---|---|---|---|---|
| 4 | 4.1 | 60 | 1.33 | 43 | 0.34 | >90 |
| 5 | 1.8 | 60 | 1.33 | 43 | 1.08 | >90 |

EXAMPLE 6

Use of the Aqueous Dispersions Obtained in Examples 1 to 3 for the Coating of a Poly(Vinyl Chloride) Film The aqueous dispersions of vinylidene chloride polymer which were prepared in Examples 1 to 3 were used to each coat a poly(vinyl chloride) film. The three coated films obtained were denoted coating 1 (prepared with the aqueous dispersion of Example 1), coating 2 (prepared with the aqueous dispersion of Example 2) and coating 3 (prepared with the aqueous dispersion of Example 3) respectively.

A layer of the adhesion promoter Adcote® 376 was first of all deposited on each poly(vinyl chloride) film by the reverse roll coating technique on a Jagenberg-type coating machine. The three films obtained were subsequently subjected to a corona treatment before each being coated respectively with one of the aqueous dispersions of vinylidene chloride polymer which were prepared in Examples 1 to 3, by the air knife coating technique, with a coating rate of 15 m/minute. The coating roll had a speed of 60 revolutions/minute. The three coated films were subsequently dried in a drying tunnel in which the temperature in the two regions was 80° C.; the temperature measured within each coating at this moment was 70° C. The thickness of the layer of vinylidene chloride polymer deposited in two passes on each poly(vinyl chloride) film was 40 g of dry vinylidene chloride polymer per $m^2$ of film.

The permeability to water vapour of each coated film was measured according to ASTM Standard E96-80 at 38° C. and 90% relative humidity. The release of hydrochloric acid (HCl) for each coated film was measured in the following way: an amount of 1 g±0.1 mg of sample is weighed out in a boat, which is transferred inside a cylindrical pyrex receptacle maintained at 160° C. in an oil bath. This receptacle is surrounded by a series of turns, one end of which series is connected to the bottom of the cylinder. The other end is connected to the compressed air line. The outlet of the cylinder is connected, via a fine polytetrafluoroethylene tube, to the measurement cell. The air, heated by passing through the turns, flushes the sample and entrains the hydrochloric acid possibly formed. The gas flow passes through a sodium acetate/acetic acid buffer solution. The Cl⁻ ions retained in this buffer are quantitatively determined by direct potentiometry using an electrode sensitive to Cl⁻ ions. The potential difference measured between this indicator electrode and a reference electrode is continuously recorded. This measurement is compared with a calibration curve prepared beforehand. This comparison makes it possible to determine the content of chloride at a specific moment and thus the amount of hydrochloric acid given off at this instant.

The results of the permeability to water vapour of the 3 coated films and of their release of hydrochloric acid are summarized in Table III.

TABLE III

| Coating | pH | Permeability to water vapour; $g/m^2 \cdot day$ | Release of HCl after 30 minutes at 160° C.; mg HCl/kg | Release of HCl after 60 minutes at 160° C.; mg HCl/kg |
| --- | --- | --- | --- | --- |
| 1 | 4 | 0.9 | 10 | 92 |
| 2 | 3.6 | 0.9 | 5 | 76 |
| 3 | 2 | 0.9 | 21 | 171 |

EXAMPLE 7

Use of the Aqueous Dispersions Obtained in Examples 4 and 5 for the Coating of a Poly(Vinyl Chloride) Film The aqueous dispersions of vinylidene chloride polymer which were prepared in Examples 4 and 5 were used to each coat a poly(vinyl chloride) film. The two coated films obtained were denoted coating 4 (prepared with the aqueous dispersion of Example 4) and coating 5 (prepared with the aqueous dispersion of Example 5) respectively.

A layer of adhesion promoter Adcote® 376 was first of all deposited on each poly(vinyl chloride) film by the reverse roll coating technique on a Jagenberg-type coating machine. The two films obtained were subsequently subjected to a corona treatment before each being coated, on a Bachofen-type coating machine, respectively with one of the aqueous dispersions of vinylidene chloride polymer which were prepared in Examples 4 and 5, by the gravure roll coating technique, with a coating rate of 60 m/minute. The speed of the gravure roll (rotating in the reverse direction) was 75 revolutions/minute. The two coated films were subsequently dried in a drying tunnel in which the temperature in the three regions was 110-107-90° C.; the temperature measured within each coating at this moment was 75° C. The thickness of the layer of vinylidene chloride polymer deposited in several passes on each poly(vinyl chloride) film was 40 g of dry vinylidene chloride polymer per $m^2$ of film.

The permeability to water vapour of the two coated films and their release of hydrochloric acid were measured in the same way as in Example 6.

The results of these measurements are summarized in Table IV.

TABLE IV

| Coating | pH | Permeability to water vapour; $g/m^2 \cdot day$ | Release of HCl after 30 minutes at 160° C.; mg HCl/kg | Release of HCl after 60 minutes at 160° C.; mg HCl/kg |
| --- | --- | --- | --- | --- |
| 4 | 4.1 | 0.6 | 38 | 312 |
| 5 | 1.8 | 0.6 | 199 | 941 |

EXAMPLE 8

Preparation of an Aqueous Dispersion of Vinylidene Chloride Polymer Comprising a Wax An aqueous dispersion of the copolymer of vinylidene chloride and of methyl acrylate, Ixan® PA 114 (Solvay), was obtained. The amount of trisodium phosphate ($Na_3PO_4 \cdot 12H_2O$), in the form of a 100 g/litre aqueous solution, needed to bring the pH of the aqueous dispersion to 2.3 was added to this aqueous dispersion. The equivalent of 20 g/kg on a dry basis of an aqueous emulsion of wax X 100 K, sold by Solvay, was subsequently added to the aqueous dispersion with gentle stirring, without diluting and for a time of 15 to 30 minutes.

The pH, the content of dry matter, the surface tension and the stability were measured, in the same way as in Example 1, on the aqueous dispersion, obtained after the addition of trisodium phosphate and of wax, of the vinylidene chloride polymer.

The results of these various measurements are summarized in Table V.

EXAMPLE 9

Comparative Example

An aqueous dispersion of the copolymer of vinylidene chloride and of methyl acrylate, Ixan® PA 114 (Solvay), was obtained. The equivalent of 20 g/kg on a dry basis of an aqueous emulsion of wax X 100 K, sold by Solvay, was added to this aqueous dispersion with gentle stirring, without diluting and for a time of 15 to 30 minutes.

The pH, the content of dry matter, the surface tension and the stability were measured, in the same way as in Example 1, on the aqueous dispersion, to which basic agent has not been added but certainly a wax has been added, of the vinylidene chloride polymer.

The results of these various measurements are summarized in Table V.

EXAMPLE 10

Comparative Example

An aqueous dispersion of the copolymer of vinylidene chloride and of methyl acrylate, Ixan® PA 114 (Solvay), was obtained.

The pH, the content of dry matter, the surface tension and the stability were measured, in the same way as in Example 1, on the aqueous dispersion, to which neither basic agent nor wax has been added, of the vinylidene chloride polymer.

The results of these various measurements are summarized in Table V and in Table VI.

TABLE V

| Example | pH | Dry matter; % by weight | Surface tension; mN/m | Stability; % by weight of lumps |
|---|---|---|---|---|
| 8 | 2.3 | 58 | 44 | 5.8 |
| 9 | 1.5 | 58 | 44 | 8.6 |
| 10 | 1.5 | 58 | 44 | 0.14 |

EXAMPLE 11

Preparation of an Aqueous Dispersion of Vinylidene Chloride Polymer Comprising a Wax An aqueous dispersion of the copolymer of vinylidene chloride and of methyl acrylate, Ixan® PA 114 (Solvay), was obtained. The amount of trisodium phosphate ($Na_3PO_4.12H_2O$), in the form of a 100 g/litre aqueous solution, needed to bring the pH of the aqueous dispersion to 2.3 was added to this aqueous dispersion. The equivalent of 20 g/kg on a dry basis of an aqueous emulsion of wax Michem® Lube 160, sold by Michelman, was subsequently added to the aqueous dispersion with gentle stirring, without diluting and for a time of 15 to 30 minutes.

The pH, the content of dry matter, the surface tension and the stability were measured, in the same way as in Example 1, on the aqueous dispersion, obtained after the addition of trisodium phosphate and of wax, of the vinylidene chloride polymer.

The results of these various measurements are summarized in Table VI.

EXAMPLE 12

Comparative Example

An aqueous dispersion of the copolymer of vinylidene chloride and of methyl acrylate, Ixan® PA 114 (Solvay), was obtained. The equivalent of 20 g/kg on a dry basis of an aqueous emulsion of wax Michem® Lube 160, sold by Michelman, was added to this aqueous dispersion with gentle stirring, without diluting and for a time of 15 to 30 minutes.

The pH, the content of dry matter, the surface tension and the stability were measured, in the same way as in Example 1, on the aqueous dispersion, to which basic agent has not been added but certainly a wax has been added, of the vinylidene chloride polymer.

The results of these various measurements are summarized in Table VI.

TABLE VI

| Example | pH | Dry matter; % by weight | Surface tension; mN/m | Stability; % by weight of lumps |
|---|---|---|---|---|
| 11 | 2.3 | 58 | 44 | 0.07 |
| 12 | 1.5 | 58 | 44 | 0.17 |
| 10 | 1.5 | 58 | 44 | 0.14 |

EXAMPLE 13

Preparation of an Aqueous Dispersion of Vinylidene Chloride Polymer

An aqueous dispersion of the vinylidene chloride copolymer, Ixan® PA 232 (Solvay), which exhibits a white colouring, was obtained. The amount of trisodium phosphate ($Na_3PO_4.12H_2O$), in the form of a 100 g/litre aqueous solution, needed to bring the pH of the aqueous dispersion to 4 was added to this aqueous dispersion.

The pH was measured in the same way as in Example 1.

Observation of the colouring of the aqueous dispersion obtained indicated a slightly yellowish white colouring after 48 hours.

EXAMPLE 14

Comparative Example

An aqueous dispersion of the vinylidene chloride copolymer, Ixan® PA 232 (Solvay), which exhibits a white colouring, was obtained. The amount of trisodium phosphate ($Na_3PO_4.12H_2O$), in the form of a 100 g/litre aqueous solution, needed to bring the pH of the aqueous dispersion to 7 was added to this aqueous dispersion.

The pH was measured in the same way as in Example 1.

Observation of the colouring of the aqueous dispersion immediately after the addition of trisodium phosphate indicated a vanilla yellow colouring.

EXAMPLE 15

Preparation of an Aqueous Dispersion of Vinylidene Chloride Polymer

An aqueous dispersion of the copolymer of vinylidene chloride and of methyl acrylate, Ixan® PA 114 (Solvay), which exhibits a white colouring, was obtained. The amount of trisodium phosphate ($Na_3PO_4.12H_2O$), in the form of a 100 g/litre aqueous solution, needed to bring the pH of the aqueous dispersion to 2.6 was added to this aqueous dispersion.

The pH, the content of dry matter and the stability were measured, in the same way as in Example 1, on the aqueous dispersion, obtained after the addition of trisodium phosphate, of the vinylidene chloride polymer.

Observation of the colouring of the aqueous dispersion 2 hours after the addition of trisodium phosphate indicated a white colouring.

The results of these various measurements are summarized in Table VII.

EXAMPLE 16

Preparation of an Aqueous Dispersion of Vinylidene Chloride Polymer

An aqueous dispersion of the copolymer of vinylidene chloride and of methyl acrylate, Ixan® PA 114 (Solvay), which exhibits a white colouring, was obtained. The amount of trisodium phosphate ($Na_3PO_4.12H_2O$), in the form of a 100 g/litre aqueous solution, needed to bring the pH of the aqueous dispersion to 4.55 was added to this aqueous dispersion.

The pH, the content of dry matter and the stability were measured, in the same way as in Example 1, on the aqueous dispersion, obtained after the addition of trisodium phosphate, of the vinylidene chloride polymer.

Observation of the colouring of the aqueous dispersion 2 hours after the addition of trisodium phosphate indicated a slightly pinkish colouring.

The results of these various measurements are summarized in Table VII.

EXAMPLE 17

Comparative Example

An aqueous dispersion of the copolymer of vinylidene chloride and of methyl acrylate, Ixan® PA 114 (Solvay), which exhibits a white colouring, was obtained. The amount of trisodium phosphate ($Na_3PO_4.12H_2O$), in the form of a 100 g/litre aqueous solution, needed to bring the pH of the aqueous dispersion to 7 was added to this aqueous dispersion.

The pH, the content of dry matter and the stability were measured, in the same way as in Example 1, on the aqueous dispersion, obtained after the addition of trisodium phosphate, of the vinylidene chloride polymer.

Observation of the colouring of the aqueous dispersion 2 hours after the addition of trisodium phosphate indicated a salmony yellow colouring.

The results of these various measurements are summarized in Table VII.

EXAMPLE 18

Comparative Example

An aqueous dispersion of the copolymer of vinylidene chloride and of methyl acrylate, Ixan® PA 114 (Solvay), which exhibits a white colouring, was obtained.

The pH, the content of dry matter and the stability were measured, in the same way as in Example 1, on the aqueous dispersion, to which basic agent has not been added, of the vinylidene chloride polymer.

The results of these various measurements are summarized in Table VII.

TABLE VII

| Example | pH | Dry matter; % by weight | Colouring | Stability; % by weight of lumps |
|---------|------|-------------------------|------------------|---------------------------------|
| 15 | 2.6 | 59 | White | 0.73 |
| 16 | 4.55 | 59 | Slightly pinkish | 0.64 |
| 17 | 7 | 58 | Salmony yellow | 0.9 |
| 18 | 1.65 | 60 | White | 1.1 |

The invention claimed is:

1. A latex of halogenated vinyl polymers, wherein the latex further comprises a basic agent selected from the group consisting of alkali metal phosphates, mixtures of alkali metal phosphates, mixtures of another basic agent with an alkali metal phosphate and mixtures of another basic agent with mixtures of alkali metal phosphates in an amount such that the pH is less than or equal to 4.5 and wherein the halogenated vinyl polymers are vinylidene-chloride polymers wherein the vinylidene-chloride polymers comprise at least 50% by weight of vinylidene chloride.

2. The latex of halogenated vinyl polymers according to claim 1, wherein the basic agent is trisodium phosphate.

3. The latex of halogenated vinyl polymers according to claim 1, wherein the pH of the latex is greater than 2.

4. The latex of halogenated vinyl polymers according to claim 1, wherein the latex additionally comprises a wax.

5. A method of coating, comprising coating substrates made of polymers, of paper or of regenerated cellulose with the latex of halogenated vinyl polymers according to claim 1.

6. A method of producing pharmaceutical blister packs comprising forming the blister packs with the latex of halogenated vinyl polymers according to claim 1.

7. The latex according to claim 1, wherein said latex comprises at least one alkali metal phosphate selected from the group consisting of trisodium phosphate, tripotassium phosphate, disodium phosphate, dipotassium phosphate, monosodium phosphate, and monopotassium phosphate.

8. The latex as claimed in claim 1, wherein said latex has a solids concentration of at most 70% by weight.

9. The latex as claimed in claim 1, wherein individual polymer particles in said latex exhibit mean diameters of approximately at least 0.1 µm.

10. The latex as claimed in claim 1, wherein individual polymer particles in the latex exhibit mean diameters of approximately at most 0.2 µm.

11. The latex as claimed in claim 1, wherein the another basic agent is selected from the group consisting of alkaline earth metal hydroxides, alkali metal phosphites, alkali metal carbonates, alkali metal citrates, alkali metal acetates, alkali metal formates, and alkali metal oxides.

12. The latex of claim 1, wherein the pH is less than or equal to 4.

* * * * *